(12) United States Patent
Sato et al.

(10) Patent No.: US 12,377,887 B2
(45) Date of Patent: Aug. 5, 2025

(54) FIRE-RESISTANT FLOOR STRUCTURE OF RAILROAD VEHICLE

(71) Applicant: NIPPON SHARYO, LTD., Nagoya (JP)

(72) Inventors: Tetsuro Sato, Toyokawa (JP); Hiroki Uchikawa, Toyokawa (JP); Atsushi Shirai, Toyohashi (JP); Yuta Mano, Toyoake (JP)

(73) Assignee: NIPPON SHARYO, LTD., Nagoya (JP)

( * ) Notice: Subject to any disclaimer, the term of this patent is extended or adjusted under 35 U.S.C. 154(b) by 634 days.

(21) Appl. No.: 17/777,367

(22) PCT Filed: Jul. 9, 2020

(86) PCT No.: PCT/JP2020/026827
§ 371 (c)(1),
(2) Date: May 17, 2022

(87) PCT Pub. No.: WO2022/009377
PCT Pub. Date: Jan. 13, 2022

(65) Prior Publication Data
US 2022/0402532 A1 Dec. 22, 2022

(51) Int. Cl.
*B61D 17/10* (2006.01)
*B61F 1/08* (2006.01)

(52) U.S. Cl.
CPC .............. *B61D 17/10* (2013.01); *B61F 1/08* (2013.01)

(58) Field of Classification Search
CPC ........ B61D 17/10; B61D 17/00; B61D 49/00; B61F 1/08; B32B 33/00
See application file for complete search history.

(56) References Cited

U.S. PATENT DOCUMENTS 4,794,032 A * 12/1988 Fujii ..................... E04H 1/1261
105/396
9,233,694 B2 * 1/2016 Kato ..................... B61D 17/10
(Continued)

FOREIGN PATENT DOCUMENTS

| CN | 110203225 A * | 9/2019 | ............. B61C 17/00 |
| JP | H05-084345 B2 | 12/1993 | |
| WO | WO-2015071926 A1 * | 5/2015 | ............. B61D 17/10 |

OTHER PUBLICATIONS

Sep. 29, 2020 Written Opinion issued in International Patent Application No. PCT/JP2020/026827.
(Continued)

*Primary Examiner* — S. Joseph Morano
*Assistant Examiner* — Cheng Lin
(74) *Attorney, Agent, or Firm* — Oliff PLC

(57) ABSTRACT

A railroad vehicle fire-resistant floor structure with improved fire resistance against underfloor fires includes a mounting part for installing underfloor equipment on the lower surface of an underframe, and a fire-resistant member. The fire-resistant member is a fire-resistant coating applied to the lower surface of the underframe. The fire-resistant coating is preferably a foamable fire-resistant coating. A cover that covers an exposed portion exposed from the fire-resistant coating (foamable fire-resistant coating) is attached to the mounting part. The underfloor equipment is installed at the mounting part with a closing plate sandwiched therebetween.

7 Claims, 9 Drawing Sheets

(56) References Cited

U.S. PATENT DOCUMENTS

| 9,376,125 B2* | 6/2016 | Bigras | B61D 17/00 |
| 2018/0215398 A1* | 8/2018 | Cecchi | B61D 17/10 |

OTHER PUBLICATIONS

Jan. 19, 2023 International Preliminary Report on Patentability issued in International Patent Application No. PCT/JP2020/026827.
Sep. 29, 2020 International Search Report issued in International Patent Application No. PCT/JP2020/026827.

* cited by examiner

FIG. 5
(a)
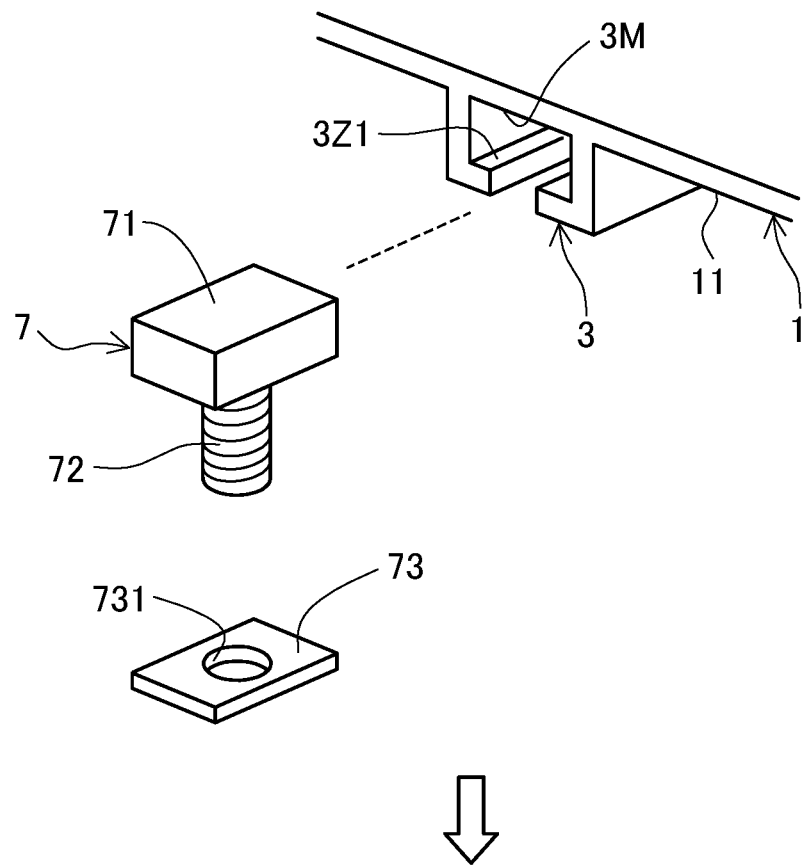
(b)
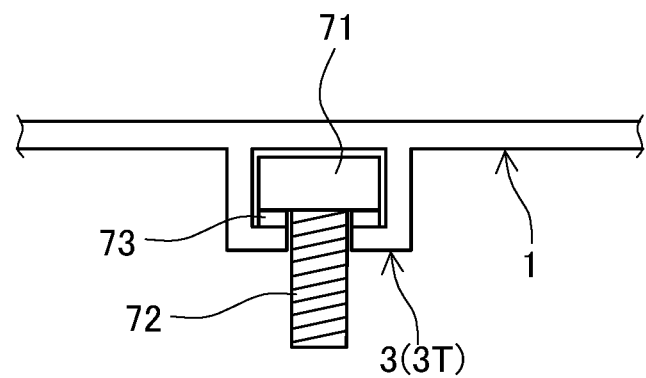

FIRE-RESISTANT FLOOR STRUCTURE OF RAILROAD VEHICLE

CROSS-REFERENCE TO RELATED APPLICATIONS

This is a U.S. national phase application based on the PCT International Patent Application No. PCT/JP2020/026827 filed on Jul. 9, 2020, the entire contents of which are incorporated by reference herein.

TECHNICAL FIELD

The present disclosure relates to a fire-resistant floor structure of a railroad vehicle and, particularly, to a fire-resistant floor structure of a railroad vehicle with improved fire-resistance performance against underfloor fire while maintaining the flexibility in underfloor outfitting.

BACKGROUND ART

In general, floor structures of railroad vehicles are required to be resistant to fire. Especially in foreign countries, as stipulated in NFPA 130—Chapter 8 in the U.S.A. and EN45545-3 in Europe, assuming that a fire breaks out below a floor, the floor structure must not collapse for a specified time against heating from below the floor, and the temperature of an upper surface of the floor must be a specified temperature or lower in order to ensure that passengers can have sufficient time to evacuate. Therefore, fire-resistant floor structures of railroad vehicles have been considered with improved fire-resistance performance against underfloor fire.

For example, Patent Document 1 discloses a fire-resistant floor structure of a vehicle, as described below. Specifically, as shown in FIG. 13, a vehicle fire-resistant floor structure 100 is disclosed, including an upper layer 101 mainly composed of rubber containing hydroxide, a middle layer 102 in contact with the entire surface of the upper layer 101 to support this upper layer 101, and a lower layer 103. At least the middle layer 102 and the lower layer 103 are made of non-combustible materials. A heat-insulating material layer 104 is provided between the middle layer 102 and the lower layer 103. The lower layer 103 is fastened to a mounting part 105 provided to the middle layer 102 or to a connecting member 106 attached to the middle layer 102. The mounting part 105 or the connecting member 106 is formed with a T-shaped groove with a wide back to catch a bolt head of underfloor equipment. This groove opens to the outside. Herein, the middle layer 102 is formed of an aluminum extruded block, the lower layer 103 is formed of a stainless steel plate, and the heat-insulating material layer 104 is made of glass fibers or ceramic fibers.

RELATED ART DOCUMENTS

Patent Documents

Patent Document 1: Japanese examined patent publication No. H5-84345

SUMMARY OF INVENTION

Problems to be Solved by the Invention

However, the vehicle fire-resistant structure 100 disclosed in Patent Document 1 has the following problems. Specifically, the foregoing fire-resistant structure 100 includes the heat-insulating material layer 104 made of glass fibers or ceramic fibers and the lower layer 103 formed of a stainless steel plate, which are placed under the middle layer 102 formed of an aluminum extruded block. This structure 100 therefore has a problem that the space under the middle layer 102 is narrow because of the thickness of the heat-insulating material layer 104 and others (e.g., about 60 mm), resulting in deteriorated flexibility in installation of underfloor equipment.

The lower layer 103 is fixed to the mounting part 105 provided to the middle layer 102 or is fixed to the connecting member 106 attached to the middle layer 102. The mounting part 105 or the connecting member 106 includes a T-shaped groove with a wide back to catch the bolt head of underfloor equipment and this groove is exposed to the outside. Accordingly, the following problems arise when the floor is subjected to heat from below. That is, the heat transfers to the middle layer 102 through the externally exposed groove and thus the temperature of the upper surface of the floor is apt to rise.

The present disclosure has been made to address the above problems and has a purpose to provide a fire-resistant floor structure of a railroad vehicle, capable of suppressing intrusion of heat to an upper surface of a floor to achieve an improved heat-resistance performance, against heating from below the floor due to fire, while maintaining the flexibility in installation of underfloor equipment.

Means of Solving the Problems (1) To achieve the above-mentioned purpose, one aspect of the present disclosure provides a fire-resistant floor structure of a railroad vehicle, including: a mounting part for installing an underfloor equipment to a lower surface of an underframe; and a fire-resistant member, and having improved fire-resistance performance against underfloor fire, wherein the fire-resistant member is fire-resistant coating applied to the lower surface of the underframe, and the mounting part includes an exposed portion exposed from the fire-resistant coating, and is attached with a cover that covers the exposed portion.

According to the foregoing configuration, the fire-resistant member is the fire-resistant coating applied to the lower surface of the underframe. Thus, the fire-resistant member can be formed thinner than a heat-insulating layer made of glass fibers or ceramic fibers, so that a larger space can be provided under the underframe. This configuration can enhance the flexibility in installation of the underfloor equipment while suppressing intrusion of heat through the lower surface of the underframe.

Since the mounting part is attached with the cover for covering the exposed portion that is exposed from the fire-resistant coating, the cover attached to the mounting part can block heat against heating from below a floor due to fire, thus preventing transfer of heat to the underframe through the mounting part. This configuration can avoid a phenomenon that the fire-resistant coating applied to the lower surface of the underframe early melts and falls off. Consequently, the fire-resistant performance of the fire-resistant coating applied to the lower surface of the underframe can be maintained for a long period of time, which can delay a rise in temperature of the floor upper surface, hence allowing sufficient time for passengers and crew members to evacuate.

Thus, the one aspect of the present disclosure can provide a fire-resistant floor structure of a railroad vehicle, capable of suppressing intrusion of heat to the floor upper surface against heating from below the floor to achieve improved fire-resistant performance while ensuring the flexibility in installation of the underfloor equipment.

(2) In the fire-resistant floor structure of a railroad vehicle described in (1), preferably, the underfloor equipment is installed on the mounting part with a closing plate interposed between them.

According to the foregoing configuration, the underfloor equipment is installed on the mounting part while the closing plate is interposed between the underfloor equipment and the mounting part. Thus, even if the underfloor equipment rapidly burns and falls off, the closing plate is left attached to the mounting part. This closing plate can keep the heat from transferring to the underframe through the mounting part. This configuration can further delay a temperature rise of the upper surface of the floor, thereby allowing sufficient time for passengers and crew members to evacuate.

(3) In the fire-resistant floor structure of a railroad vehicle described in (2), preferably, the closing plate is made of a material with lower heat conductivity than the mounting part.

According to the foregoing configuration, the closing plate is made of a material having lower heat conductivity than the mounting part. Thus, the closing plate can further suppress heat transfer to the mounting part against heating from below the floor. This configuration can further delay a temperature rise of the floor upper surface, so that the underframe is unlikely to be deformed and thus can maintain the fire-resistant performance for a long period. It is consequently possible to further delay the deformation of the underframe and the temperature rise of the floor upper surface, thereby allowing sufficient time for passengers and crew members to evacuate.

(4) In the fire-resistant floor structure of a railroad vehicle described in one of (1) to (3), preferably, the cover is coated with the fire-resistant coating.

According to the foregoing configuration, the cover is applied with the fire-resistant coating. This fire-resistant coating applied to the cover can block intrusion of more heat against heating from below the floor. This configuration can further delay the deformation of the underframe and a temperature rise of the floor upper surface, thus allowing sufficient time for passengers and crew members to evacuate.

(5) In the fire-resistant floor structure of a railroad vehicle described in one of (1) to (4), preferably, the fire-resistant coating is a foamable fire-resistant coating.

According to the foregoing configuration, the fire-resistant coating is the foamable, or intumescent, fire-resistant coating. When heated to a predetermined temperature, the coating internally foams and expands, forming a heat-insulating layer. This heat-insulating layer can further suppress intrusion of heat through the lower surface of the underframe. Further, the foamable fire-resistant coating can be applied thinner as compared with a heat-insulating layer made of glass fibers or the like, so that a larger space can be provided under the underframe. Consequently, this configuration can further enhance the flexibility in installation of the underfloor equipment while suppressing intrusion of heat through the lower surface of the underframe.

(6) In the fire-resistant floor structure of a railroad vehicle described in one of (1) to (5), preferably, the cover is made of a material with lower heat conductivity than the mounting part.

According to the foregoing configuration, the cover is made of a material with lower heat conductivity than the mounting part. This cover can further suppress heat transfer to the mounting part against heating from below the floor. This configuration can further delay a temperature rise of the floor upper surface.

(7) In the fire-resistant floor structure of a railroad vehicle described in one of (2) to (6), preferably, the underframe is formed of an extruded profile made of aluminum alloy, the mounting part is provided as a protruding part in which a hanging groove is formed in a T-shape, the protruding part being integral with the underframe, protruding downward from the lower surface of the underframe, and extending along a vehicle front-back direction, and the underfloor equipment is fastened to the mounting part with the closing plate interposed between them by means of a hanging bolt having a head inserted in the hanging groove.

According to the foregoing configuration, the underframe is formed of an extruded profile made of aluminum alloy, the mounting part is provided as the protruding part formed therein with the hanging groove having a T-shape. The protruding part is integral with the underframe, protrudes downward from the lower surface of the underframe, and extends along the front-back direction of the vehicle. Further, the underfloor equipment is fastened to the mounting part while the closing plate is interposed between the mounting part and the underfloor equipment with the hanging bolt having the head inserted in the hanging groove. This configuration enables easy installation of the underfloor equipment at any position in the front-back direction of the vehicle, while achieving reduced weight of the underframe and enhanced strength of the mounting part. Therefore, the installation position of underfloor equipment is allowed to be easily changed and also increased or decreased. Consequently, this configuration allows for even greater flexibility in installation of underfloor equipment while improving the underfloor fire-resistance performance.

(8) In the fire-resistant floor structure of a railroad vehicle described in (7), preferably, a heat-insulating member having lower heat conductivity than the hanging bolt is placed between a hanging-bolt seat surface of the hanging groove and the head of the hanging bolt.

According to the foregoing configuration, the heat-insulating member having lower heat conductivity than the hanging bolt is placed between the seat surface of the hanging groove for the hanging bolt and the head of the hanging bolt. This configuration can avoid direct transfer of heat to the hanging-bolt seat surface of the hanging groove through the hanging bolt against heating from below the floor, so that the heat is less transferred to the underframe formed with the hanging groove. It is therefore possible to further delay a temperature rise of the underframe, thereby further delaying the deformation of the underframe and a temperature rise of the floor upper surface to allow sufficient time for passengers and crew members to evacuate.

(9) In the fire-resistant floor structure of a railroad vehicle described in (7) or (8), preferably, a hanging-bolt seat surface and a closing-plate seat surface of the mounting part are uncoated with the fire-resistant coating or the foamable fire-resistant coating.

According to the foregoing configuration, the seat surface of the mounting part for the hanging bolt and the seat surface of the mounting part for the closing plate are not coated with a fire-resistant coating or foamable fire-resistant coating. This configuration can consequently avoid the hanging bolt that fastens the underfloor equipment to the mounting part from loosening due to decreased thickness of the fire-resistant coating or foamable fire-resistant coating because of aging. It is therefore possible to reduce the workload for inspecting the hanging bolt(s) that fastens the underfloor equipment.

(10) In the fire-resistant floor structure of a railroad vehicle described in one of (7) to (9), preferably, an air layer is formed between the cover and a side wall of the protruding part.

According to the foregoing configuration, the air layer is formed between the cover and the side wall of the protruding part. This air layer formed between the cover and the protruding part can block the intrusion of more heat against heating from below the floor. This configuration consequently can further delay the deformation of the underframe and a temperature rise of the floor upper surface, thereby allowing passengers and crew members to have sufficient time to evacuate.

Effects of the Invention

The present disclosure can provide a fire-resistant floor structure of a railroad vehicle, capable of suppressing intrusion of heat to an upper surface of a floor against heating from below the floor to achieve an improved fire-resistance performance, while maintaining the flexibility in installation of underfloor equipment.

BRIEF DESCRIPTION OF THE DRAWINGS

FIG. 5 is an exploded assembly diagram of a hanging groove, a hanging bolt, and a heat-insulating member shown in FIG. 4, in which (a) illustrates the hanging bolt and the heat-insulating member before being inserted in the hanging groove, and (b) illustrates the hanging bolt and the heat-insulating member after being inserted in the hanging groove;

MODE FOR CARRYING OUT THE INVENTION

A detailed description of a fire-resistant floor structure of a railroad vehicle in a present embodiment will now be given referring to the accompanying drawings. Specifically, concrete examples of the fire-resistant floor structure of a railroad vehicle in the present embodiment will be described in detail and further modified examples (first to third modified examples) will be described. Further explanation will be given to the phenomenon that the foamable fire-resistant coating melts and falls off in a comparative example of the fire-resistant floor structure of a railroad vehicle in the present embodiment.

Figure 1:
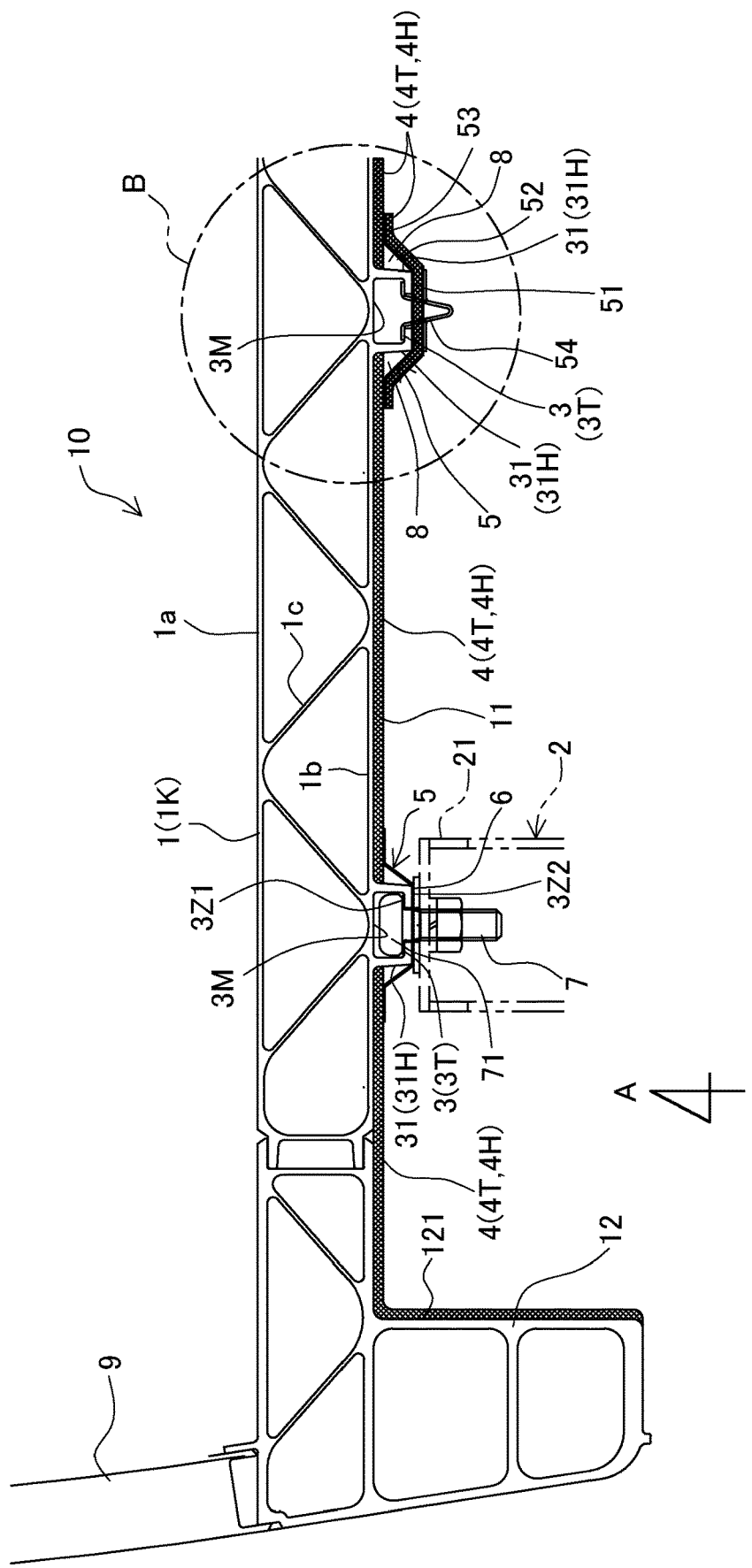
FIG. 1 is a cross-sectional view of a main part of one example of a fire-resistant floor structure of a railroad vehicle in an embodiment of the present disclosure.
Figure 2:
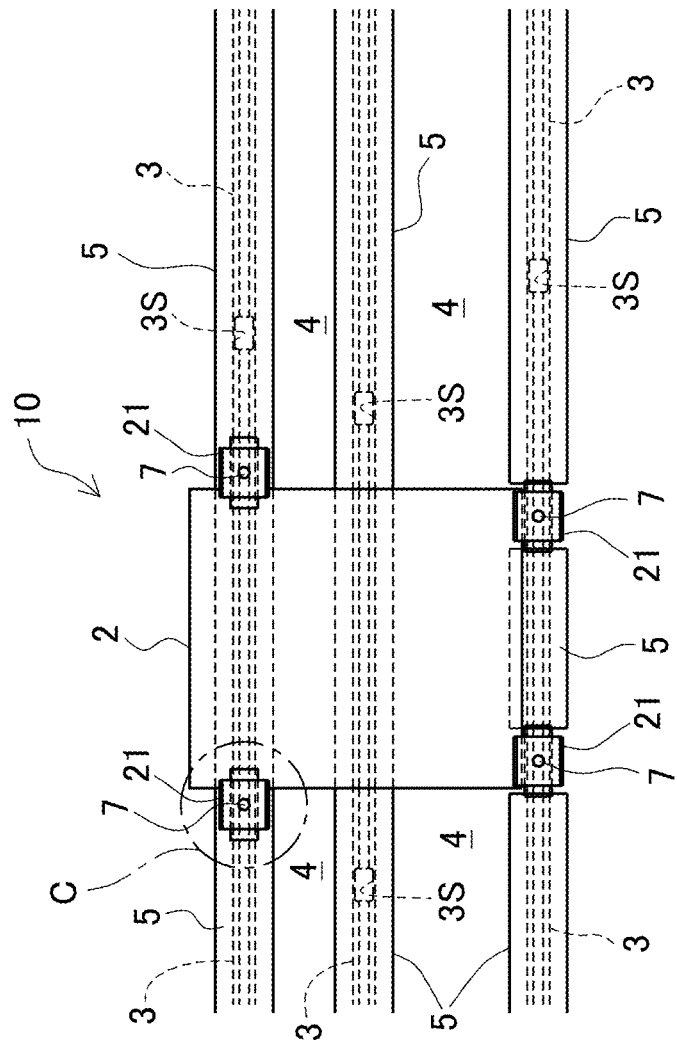
FIG. 2 is a bottom view seen from A in FIG. 1.
Figure 3:
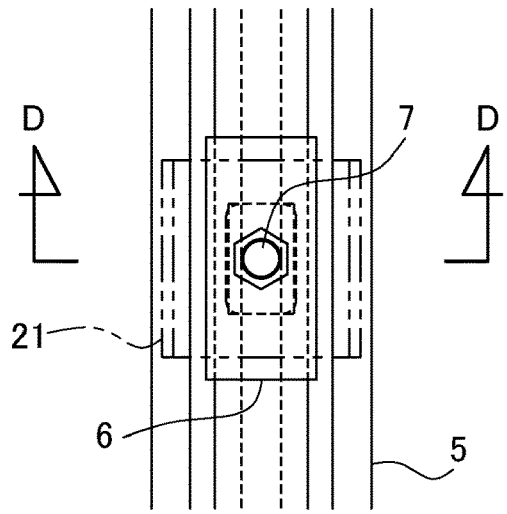
FIG. 3 is an enlarged view of a part C in FIG. 2.
Figure 4:
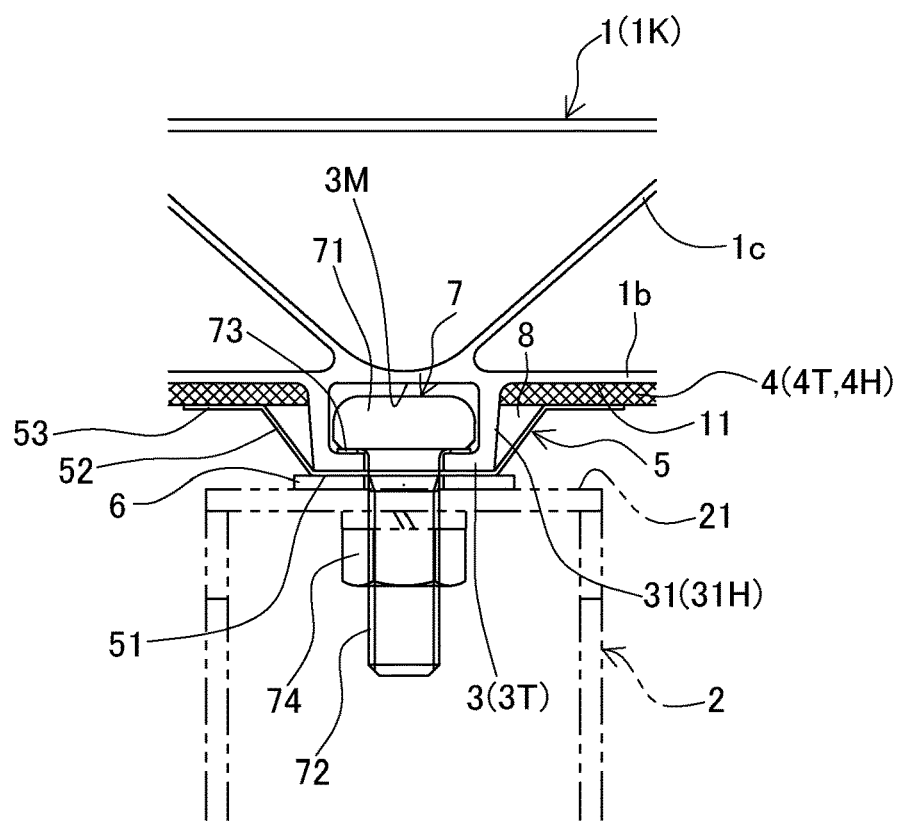
FIG. 4 is a cross-sectional view along D-D in FIG. 3.
Figure 6:
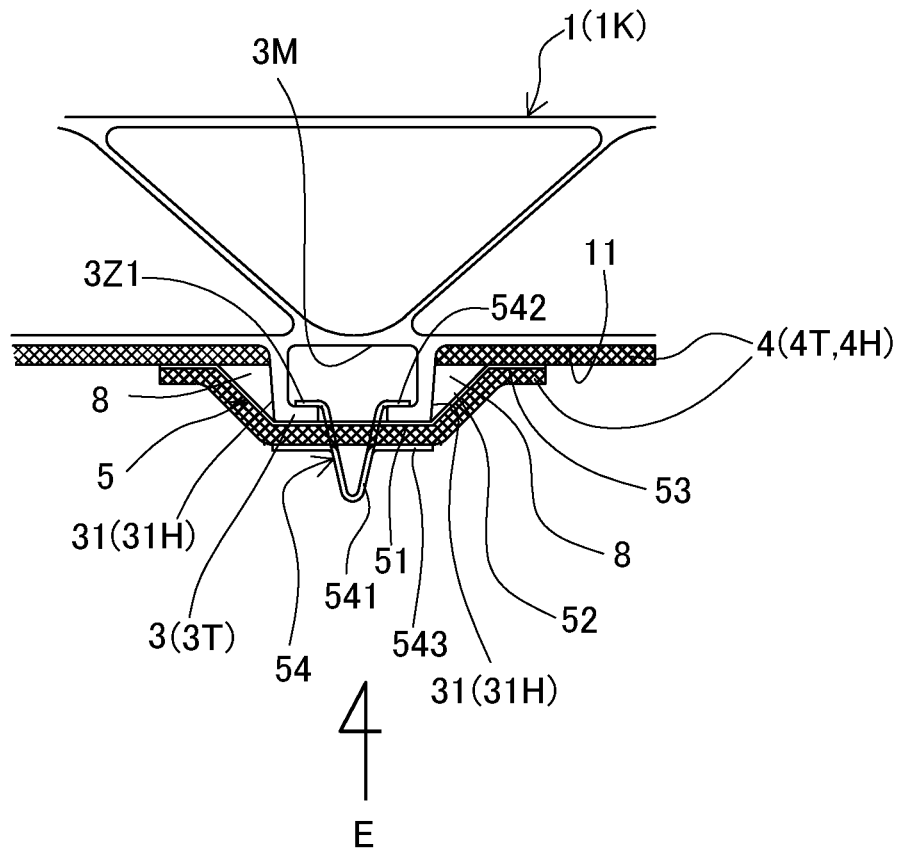
FIG. 6 is an enlarged cross-sectional view of a part B in FIG. 1.
Figure 7:
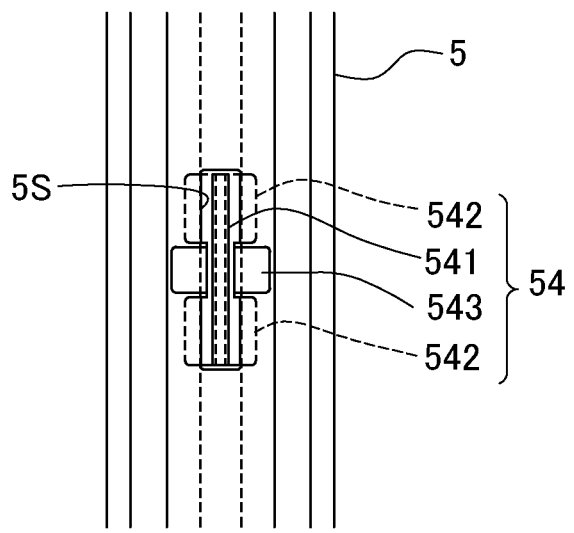
FIG. 7 is a bottom view seen from E in FIG. 6.
Figure 8:
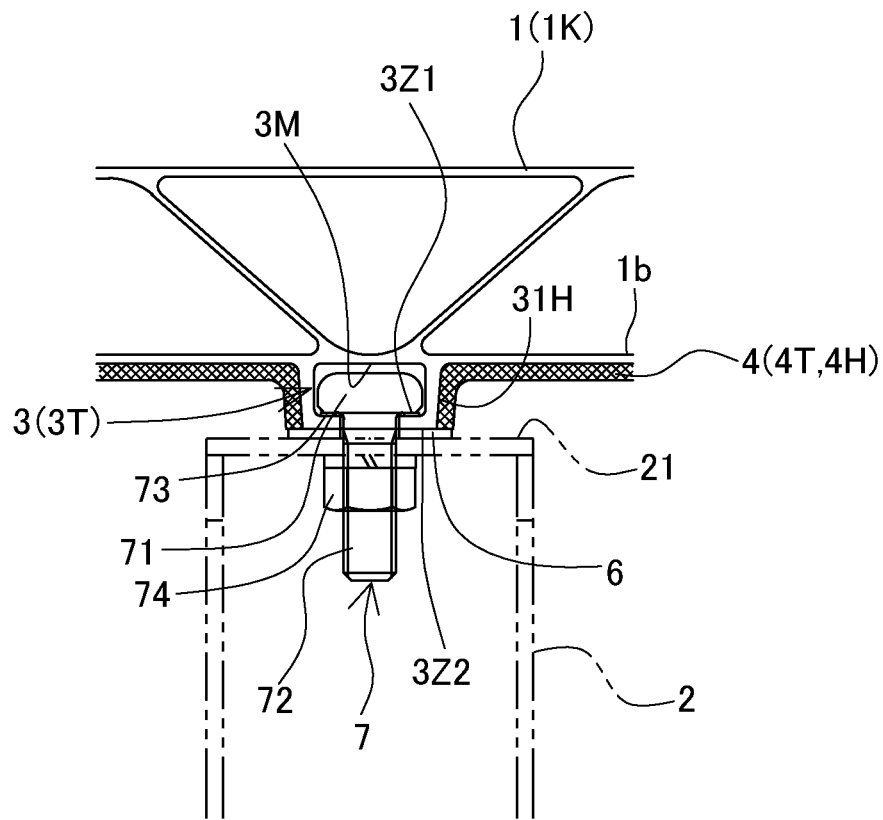
FIG. 8 is an enlarged cross-sectional view of another example of a fastening section of an underfloor equipment shown in FIG. 4.

Concrete Examples of Fire-Resistant Floor Structure of Railroad Vehicle in the Present Embodiment Concrete examples of the fire-resistant floor structure of a railroad vehicle in the present embodiment will be described first referring to FIGS. 1 to 8. FIG. 1 is a cross-sectional view of a main part of one example of the fire-resistant floor structure of a railroad vehicle in the present embodiment of the present invention. FIG. 2 is a bottom view seen from A in FIG. 1. FIG. 3 is an enlarged view of a part C in FIG. 2. FIG. 4 is a cross-sectional view along D-D in FIG. 3. FIG. 5 is an exploded assembly diagram of a hanging groove, a hanging bolt, and a heat-insulating member shown in FIG. 4. FIG. 5(*a*) illustrates the hanging bolt and the heat-insulating member before being inserted in the hanging groove, and FIG. 5(*b*) illustrates the hanging bolt and the heat-insulating member after being inserted in the hanging groove. FIG. 6 is an enlarged cross-sectional view of a part B shown in FIG. 1. FIG. 7 is a bottom view seen from E in FIG. 6. FIG. 8 is an enlarged cross-sectional view of another example of a fastening section of an underfloor equipment shown in FIG. 4.

As shown in FIGS. 1 to 7, a fire-resistant floor structure 10 of a railroad vehicle in the present embodiment has an improved fire-resistant performance against underfloor fire and is provided with mounting parts 3 for installing an underfloor equipment 2 to a lower surface 11 of an underframe 1, and fire-resistant members 4. The fire-resistant member 4 is a fire-resistant coating 4T applied to the lower surface 11 of the underframe 1. Further, each of the mounting part 3 includes an exposed portion 31 exposed from the fire-resistant coating 4T and is attached with a cover 5 for covering the exposed portion 31. This structure can thus avoid the phenomenon that the fire-resistant coating 4T applied to the lower surface 11 of the underframe 1 early melts and falls off. Consequently, the fire-resistance performance of the fire-resistant coating 4T can be maintained for a long period of time, which can delay a rise in temperature of the floor upper surface, hence allowing sufficient time for passengers and crew members to evacuate.

Herein, as shown in FIGS. 1 and 2, the mounting parts 3 are provided as a plurality of protruding parts 3T that protrude downward from the lower surface 11 of the underframe 1 and extend along a vehicle front-back direction. The fire-resistant coating 4T is applied over the entire lower surface 11 of the underframe 1 excepting the protruding parts 3T. Each cover 5 is formed with a long, upside-down hat-shaped cross-section having an open top, to cover the entire protruding part for each protruding part 3T, including an installation position of the underfloor equipment 2. Since each mounting part 3 is attached with each corresponding long cover 5, when a new underfloor equipment 2 is additionally installed or is moved to another position, the cover 5 located in the corresponding position has only to be changed or adapted.

As shown in FIGS. 3 and 4, the underfloor equipment 2 is preferably installed on the mounting part 3 with the closing plate 6 interposed between the underfloor equipment 2 and the mounting part 3. This closing plate 6 has a rectangular flat-plate shape having an adequate length for an installing unit 21 of the underfloor equipment 2. Herein, the closing plate 6 and the cover 5 are held between the installing unit 21 of the underfloor equipment 2 and the mounting part 3. In this case, even if the underfloor equipment 2 early burns and falls off, the closing plate 6 and the cover 5 are left attached on the mounting part 3 and thus can continue to suppress heat transfer to the underframe 1 via the mounting part 3.

As shown in another example shown in FIG. 8, each side wall 31H of the protruding part 3T, which corresponds to the mounting part 3 to which the underfloor equipment 2 is fastened, may be coated with the fire-resistant coating 4T. Even in this case, the underfloor equipment 2 is mounted on the mounting part 3 with the closing plate 6 interposed therebetween, and thus the mounting part 3 does not need to be attached with the cover 5 for covering an exposed portion uncoated with the fire-resistant coating 4T.

The closing plate 6 is preferably made of a material with lower heat conductivity than the mounting part 3. Accordingly, the closing plate 6 can further suppress the transfer of heat to the mounting part 3 against heating from below the floor. This can further delay a temperature rise of the floor upper surface. In this case, furthermore, the closing plate 6 is unlikely to be deformed even when heated, and thus can maintain the fire-resistant performance for a long period of time.

Further, the fire-resistant coating 4T is preferably a foamable, or intumescent, fire-resistant coating 4H that will internally foam and expand when heated to a predetermined temperature, thus forming a heat-insulating layer. This foamable heat-insulating layer can further prevent the intrusion of heat through the lower surface 11 of the underframe 1. Herein, the foamable fire-resistant coating 4H is preferably, for example, epoxy-based foamable fire-resistant coating (such as "Sikagard®-831" sold by Sika Ltd.), but other foamable fire-resistant coatings are also adoptable.

The thickness of the foamable fire-resistant coating 4H is set for example about 4 to 5 mm, but can be appropriately set according to required fire-resistant performance. Coating of the foamable fire-resistant coating 4H can be made by for example spray coating. The foamable fire-resistant coating 4H increases in thickness by about 20 to 30 times when heated to 200 to 300° C.

As shown in FIGS. 1 to 8, the underframe 1 is preferably formed of an extruded profile 1K made of aluminum alloy, but alternatively may be formed of another structural member or members (such as iron frame or frames). The underframe 1 formed of the aluminum-alloy extruded profile preferably has a so-called double-skin structure including an upper plate 1a on the floor surface side, a lower plate 1b on the underfloor side, and a connecting plate 1c connecting the upper plate 1a and the lower plate 1b in a trussed configuration. The fire-resistant coating 4T (the foamable fire-resistant coating 4H) is applied to the lower plate 1b.

Since the underframe 1 has the above-described double-skin structure formed of the aluminum-alloy extruded profile 1K, it can easily achieve reduced weight and enhanced strength. In addition, a hollow part, formed by the upper plate 1a, the lower plate 1b, and the connecting plate 1c, functions as an air heat-insulating layer, so that the heat from below is less transferred to above the floor, delaying a temperature rise on the floor.

A side beam 12 projecting downward is provided at each end of the underframe 1 in the vehicle width direction. The side beam 12 is formed of an extruded member made of aluminum alloy and has a double-skin structure. Preferably, an inner wall surface 121 of each side beam 12 is also coated with the fire-resistant coating 4T (the foamable fire-resistant coating 4H). This can enhance heat-insulation for side structure members 9 formed above the side beams 12.

The mounting part 3 is preferably provided as the protruding part 3T in which a hanging groove 3M is formed in a T-shape, the protruding part 3T being integral with the underframe 1, protruding downward and extending along the vehicle front-back direction. In this case, the upper part of the hanging groove 3M is formed as a rectangular space. The underfloor equipment 2 is fastened to the mounting part 3 with the closing plate 6 interposed between them by means of a hanging bolt(s) 7 having the head 71 inserted in the rectangular space of the hanging groove 3M. The head 71 has a rectangular shape conforming to the hanging groove 3M, thereby holding the hanging bolt 7 against spinning out within the hanging groove 3M when a nut 74 is screwed onto a screw portion 72 of the hanging bolt 7.

With the hanging grooves 3M, the underfloor equipment 2 is allowed to be installed at any position in the vehicle front-back direction. Thus, installation positions of the underfloor equipment 2 can be changed and the number of installation positions can be increased or decreased. At the lower end of each mounting part 3, as shown in FIG. 2, hanging-bolt insertion ports 3S are formed at appropriate positions to allow insertion of the heads 71 of the hanging bolts 7 into the hanging grooves 3M.

Furthermore, as shown in FIGS. 4 and 5, preferably, a heat-insulating member 73 having lower heat conductivity than the hanging bolt 7 is placed between a seat surface 3Z1, for a hanging bolt, of the hanging groove 3M and the head 71 of the hanging bolt 7. This heat-insulating member 73 has a rectangular flat plate shape and is formed, at its center, with a through hole 731 in which the screw portion 72 of the hanging bolt 7 is inserted.

The heat-insulating member 73 can prevent direct heat conduction to the hanging-bolt seat surface 3Z1 of the hanging groove 3M through the hanging bolt 7, against heating from below the floor. The heat-insulating member 73 does not need to be made of a specific material, but is preferably made of for example stainless steel having properties that heat conductivity is lower than a general hanging bolt 7 made of carbon steel and the underframe 1 made of aluminum alloy, and is unlikely to decrease in thickness over time.

In contrast, preferably, the hanging-bolt seat surface 3Z1 and a seat surface 3Z2, for a closing plate, of the mounting part 3 are not coated with the fire-resistant coating 4T (the foamable fire-resistant coating 4H). This is because such a configuration can avoid the hanging bolt 7 that fastens the underfloor equipment 2 from loosening due to decreased thickness of the fire-resistant coating 4T (the foamable fire-resistant coating 4H) because of aging. This configuration can reduce the workload for inspecting the hanging bolt 7 fastening the underfloor equipment 2. It is to be noted that the underfloor equipment 2 is usually fastened to the mounting parts 3 with a plurality of hanging bolts 7.

As described above, the mounting part 3 is attached with the cover 5 that covers the exposed portion 31 which is exposed from the fire-resistant coating 4T (the foamable fire-resistant coating 4H). As shown in FIGS. 1 and 6, preferably, the cover 5 is coated with the fire-resistant coating 4T (the foamable fire-resistant coating 4H). Herein, the cover 5 coated with the fire-resistant coating 4T (the foamable fire-resistant coating 4H) is formed in advance. Further, the foamable fire-resistant coating 4H is applied to the lower surface 11 of the underframe 1 and then the cover 5 coated with the fire-resistant coating 4T (the foamable fire-resistant coating 4H) is attached to the mounting part 3.

As shown in FIGS. 6 and 7, the cover 5 is attached to the mounting part 3 with a stopper 54 engaging with the hanging groove 3M. The stopper 54 is formed of a spring member and includes a stopper body 541 having a V shape, locking claws 542 formed at the upper end of the stopper body 541, and a supporting claw 543 formed at the middle of the stopper body 541. The stopper body 541 is inserted through an insertion hole 5S of the cover 5. The locking claws 542 engage with the hanging-bolt seat surface 3Z1 of the hanging groove 3M. The supporting claw 543 supports the cover 5 coated with the fire-resistant coating 4T (the foamable fire-resistant coating 4H). This cover 5 coated with the fire-resistant coating 4T (the foamable fire-resistant coating 4H) can further enhance the advantage of suppressing transfer of heat to the underframe 1 via the mounting part 3 against heating from below the floor.

The cover 5 is preferably made of a material with lower heat conductivity than the mounting part 3. For example, for the mounting part 3 integral with the underframe 1, which are formed of the aluminum-alloy extruded profile 1K, the cover 5 is preferably made of stainless steel. In this case, the stainless-steel cover 5 having low heat conductivity can further suppress the transfer of heat to the mounting part 3 against heating from below the floor. This configuration can further delay a temperature rise of the floor upper surface. It is also preferable that the cover 5 is made of a material that is stronger than the mounting part 3 (for example, FRP (fiber-reinforced plastic) or steel plate, or alternatively a laminated member thereof, or the like). Such a cover 5 is less likely to be damaged or deformed by pebbles and others which bounced off during running and can maintain the fire-resistant performance for a long period of time.

The cover 5 has an inverted hat-shaped cross-section and is provided with a bottom plate portion 51 that contacts the lower surface (the closing-plate seat surface 3Z2) of the mounting part 3, a pair of slant plate portions 52 extending at a slant from both sides of the bottom plate portion 51 toward the lower surface 11 of the underframe 1, and a pair of contacting plate portions 53 extending horizontally from the slant plate portions 52 and contacting the fire-resistant coating 4T (the foamable fire-resistant coating 4H) applied to the lower surface 11 of the underframe 1. In the present example, the cover 5 is attached to the mounting part 3 with the stopper 54 engaging with the hanging groove 3M. As an alternative, the stopper 54 may be a bolt, a rivet, a clip, and others.

Herein, as shown in FIGS. 4 and 6, an air layer 8 is formed between each of the slant plate portions 52 of the cover 5 and each of the side walls 31H of the protruding part 3T corresponding to the mounting part 3. Thus, the air layers 8 formed between the cover 5 and the mounting part 3 can block more heat from entering the underframe 1 from below against underfloor fire. Consequently, this configuration can further delay the deformation of the underframe 1 and the temperature rise of the floor upper surface to allow passengers and crew members to have sufficient time to evacuate.

Modified Examples of Fire-Resistant Floor Structure of Railroad Vehicle

Figure 9:
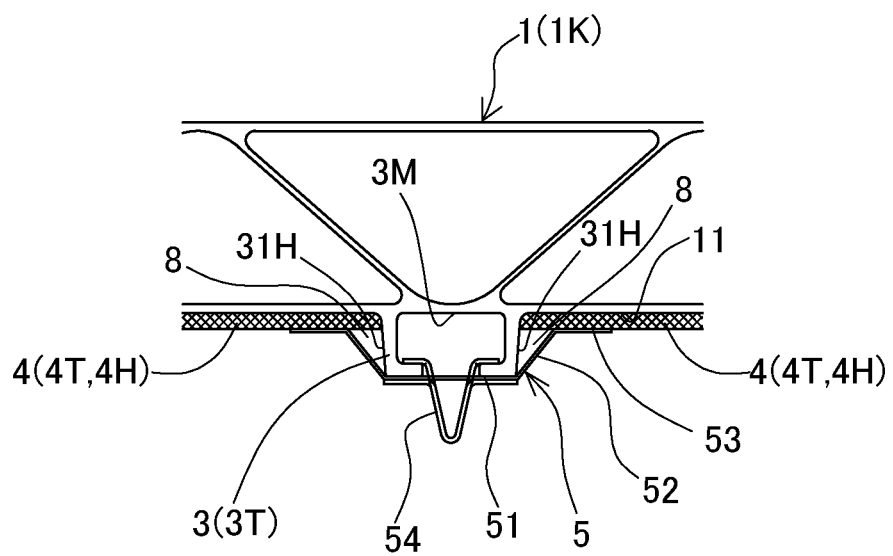
FIG. 9 is an enlarged cross-sectional view of a first modified example of the part B in FIG. 1.
Figure 10:
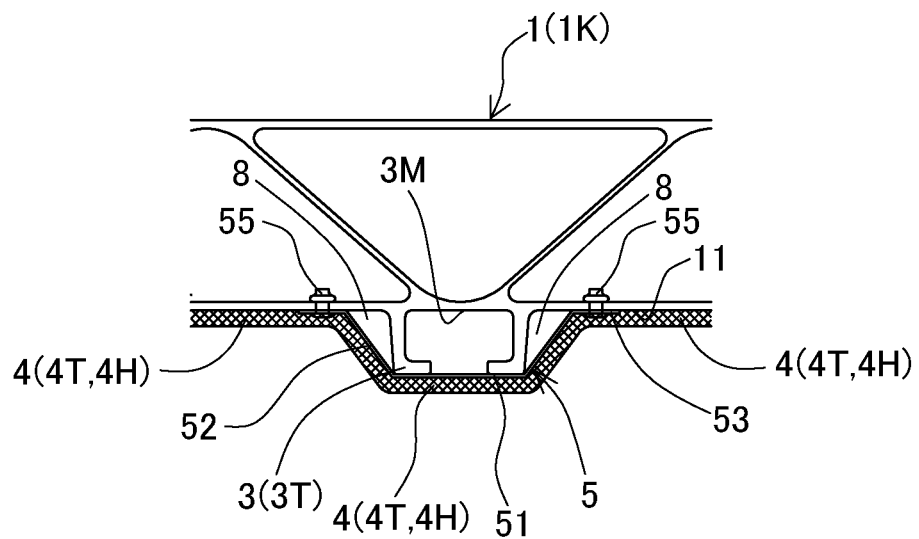
FIG. 10 is an enlarged cross-sectional view of a second modified example of the part B in FIG. 1.
Figure 11:
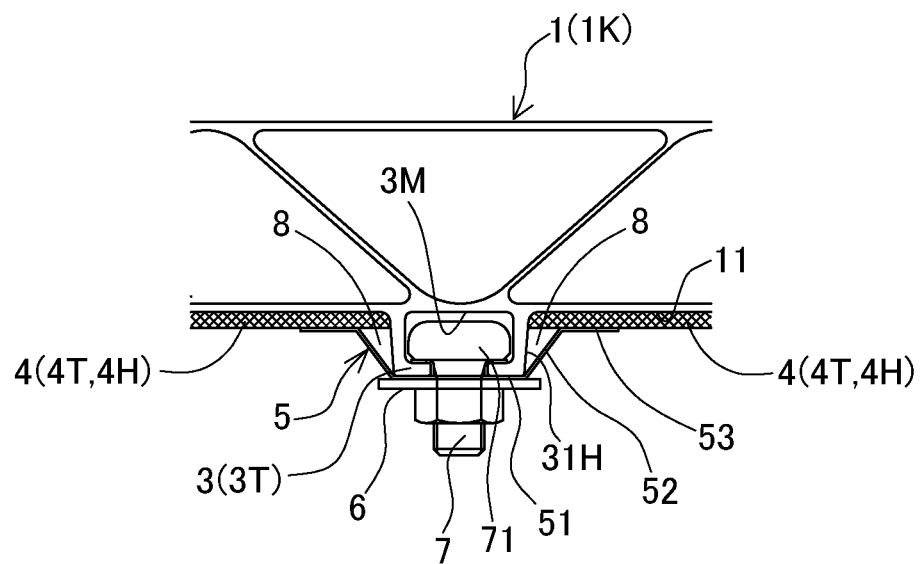
FIG. 11 is an enlarged cross-sectional view of a third modified example of the part B in FIG. 1.

Next, modified examples (first to third modified examples) of the fire-resistant floor structure of a railroad vehicle in the present embodiment will be described referring to FIGS. 9 and 11. FIG. 9 is an enlarged cross-sectional view of the first modified example of the part B shown in FIG. 1. FIG. 10 is an enlarged cross-sectional view of the second modified example of the part B shown in FIG. 1. FIG. 11 is an enlarged cross-sectional view of the third modified example of the part B shown in FIG. 1. Herein, the first to third modified examples will be described below; however, needless to say, any other variations are also adoptable without departing from the scope of the subject-matter of the invention.

First Modified Example

As shown in FIG. 9, in the first modified example of the fire-resistant floor structure 10 of a railroad vehicle, the cover 5 is not coated with the fire-resistant coating 4T (the foamable fire-resistant coating 4H). Herein, the cover 5 is produced into a predetermined shape in advance, the fire-resistant coating 4T (the foamable fire-resistant coating 4H) is applied as the fire-resistant member 4 to the lower surface 11 of the underframe 1, and then the cover 5 is attached to the mounting part 3. Specifically, the cover 5 is attached to the mounting part 3 with the stopper 54 that engages with the hanging groove 3M. The air layers 8 are formed between the slant plate portions 52 of the cover 5 and the side walls 31H of the mounting part 3. In this first modified example, the cover 5 and the air layers 8 suppress the intrusion of heat against heating from below the floor. This configuration can further delay the deformation of the underframe 1 and a temperature rise of the floor upper surface to allow passengers and crew members to have sufficient time to evacuate.

Second Modified Example

In the second modified example of the fire-resistant floor structure 10 of a railroad vehicle, as shown in FIG. 10, the lower surface 11 of the underframe 1 and the cover 5 are both coated with the fire-resistant coating 4T (the foamable fire-resistant coating 4H) which is the fire-resistant member 4. Herein, the cover 5 is fixed in advance to the lower surface 11 of the underframe 1 with a rivet 55 or the like. Subsequently, the fire-resistant coating 4T (the foamable fire-resistant coating 4H) is applied to both the lower surface 11 of the underframe 1 and the cover 5 at the same time. In this second modified example, the fire-resistant coating 4T (the foamable fire-resistant coating 4H) applied to both the lower surface 11 of the underframe 1 and the cover 5 can block intrusion of more heat against heating from below the floor. This makes it possible to further delay the deformation of the underframe 1 and the temperature rise of the floor upper surface, thus allowing sufficient time for passengers and crew members to evacuate. Since the cover 5 and the lower surface 11 of the underframe 1 can be simultaneously coated with the fire-resistant coating 4T (the foamable fire-resistant coating 4H), it is possible to reduce time and labor required to separately apply the fire-resistant coating 4T (the foamable fire-resistant coating 4H) to the cover 5.

Third Modified Example

In the third example of the fire-resistant floor structure 10 of a railroad vehicle, as shown in FIG. 11, the cover 5 is not coated with the fire-resistant coating 4T (the foamable fire-resistant coating 4H). Herein, the bottom plate portion 51 of the cover 5 is fastened to the mounting part 3 with the hanging bolt 7 having the head 71 inserted in the hanging groove 3M of the mounting part 3 by holding the closing plate 6 between the bottom plate portion 51 and the bolt 7. This double structure of the cover 5 and the closing plate 6 suppresses the intrusion of heat through the mounting part 3. Further, the air layers 8 are formed between the slant plate portions 52 of the cover 5 and the side walls 31H of the mounting part 3. In this third modified example, the cover 5, the closing plate 6, and the air layers 8 can block more heat from entering through the mounting part 3 against heating from below the floor. This configuration can further delay the deformation of the underframe 1 and the temperature rise of the floor upper surface, thereby allowing passengers and crew members to have sufficient evacuation time. This configuration using the hanging bolt 7 to attach the cover 5 can eliminate the stopper 54, and thus can simplify parts for attaching the cover 5.

Comparative Example of Fire-Resistant Floor Structure of Railroad Vehicle

Figure 12:
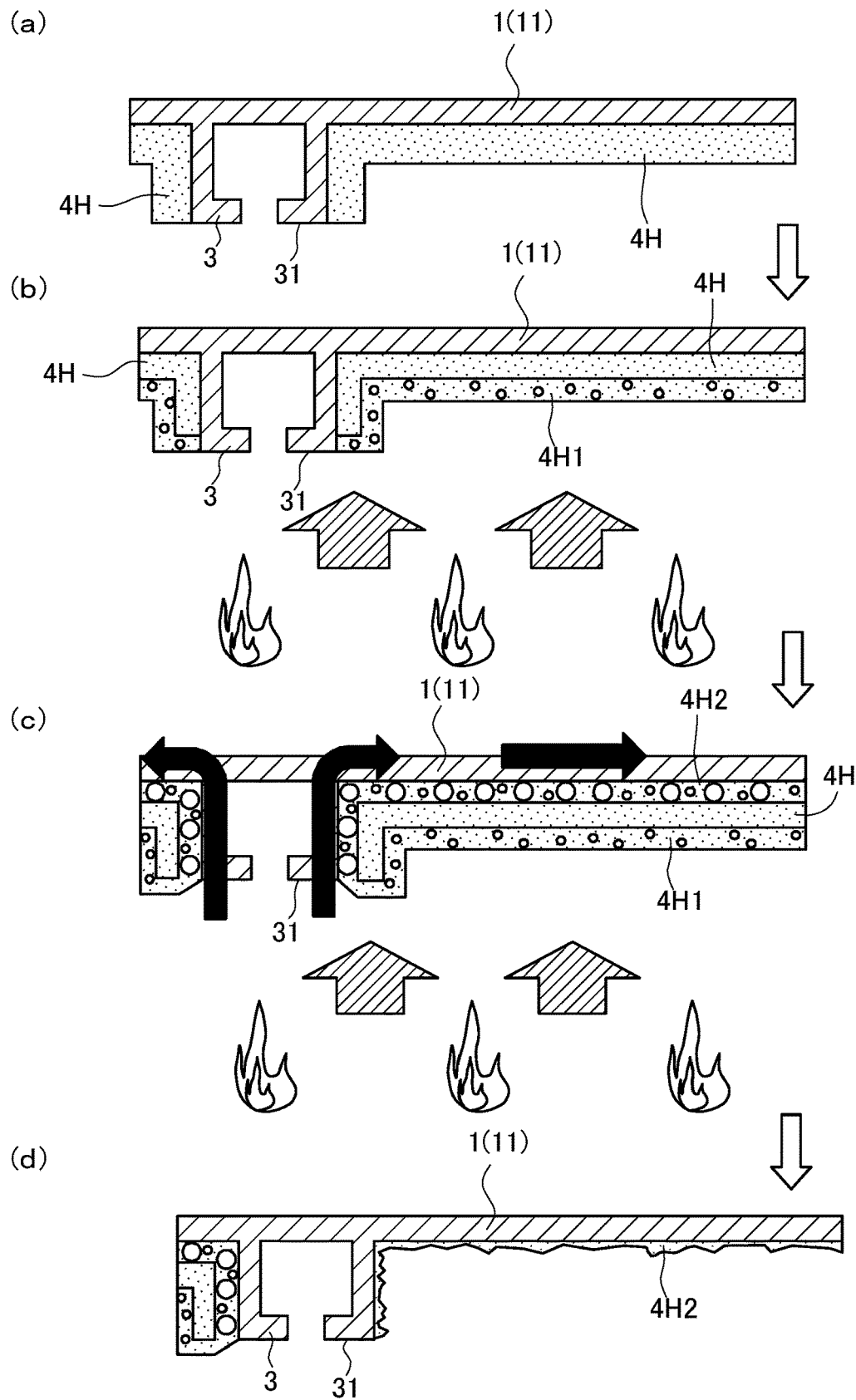
FIG. 12 is a schematic cross-sectional view showing a phenomenon that foamable fire-resistant coating melts and falls off in a comparative example compared to the fire-resistant floor structure of a railroad vehicle shown in FIG. 1, in which (a) is a cross-sectional view illustrating an underframe with a lower surface applied with a foamable fire-resistant coating while a mounting part is exposed, (b) is a cross-sectional view illustrating that the underframe is subjected to heat from below, (c) is a cross-sectional view illustrating that the foamable fire-resistant coating, on its upper side, is in an advanced state of foam-formation due to the heat conducted to the lower surface of the underframe through the mounting part, and (d) is a cross-sectional view illustrating that most of the foamable fire-resistant coating has melted and fallen off.
Figure 13:
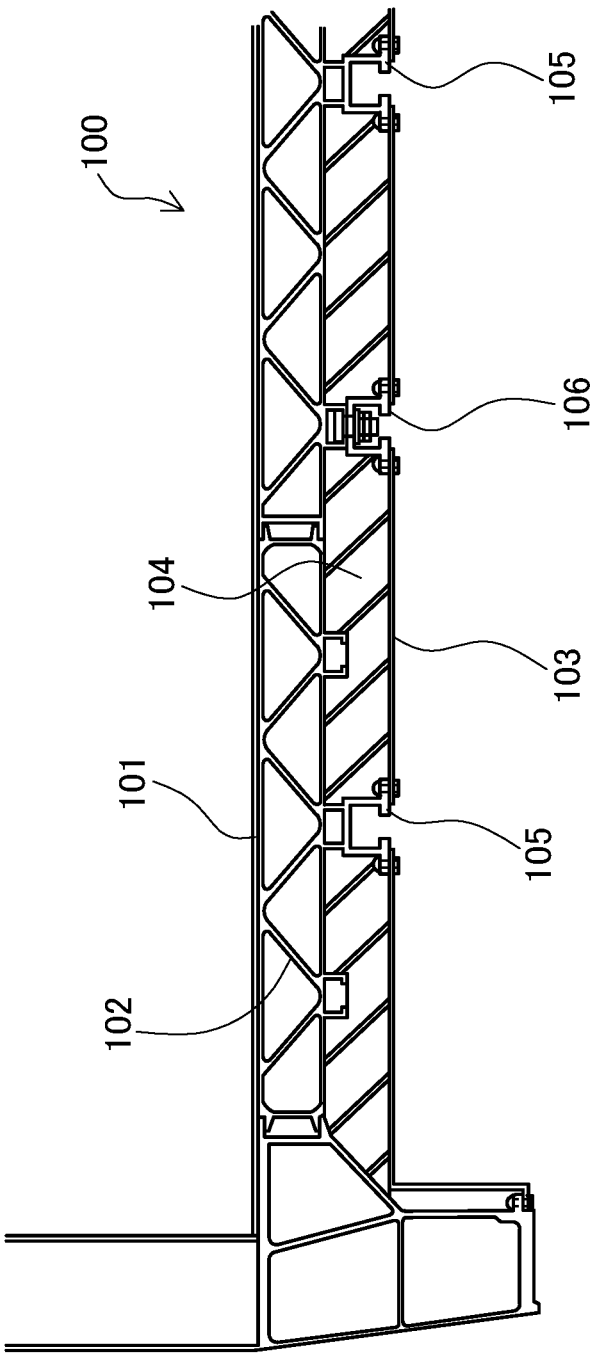
FIG. 13 is a cross-sectional view of a main part of a fire-resistant floor structure of a railroad vehicle disclosed in Patent Document 1.

A comparative example of the fire-resistant floor structure of a railroad vehicle in the present embodiment will be described below referring to FIG. 12. FIG. 12 is a schematic cross-sectional view showing the phenomenon that a foamable fire-resistant coating melts and falls off in the comparative example compared to the railroad-vehicle fire-resistant floor structure of the present embodiment shown in FIG. 1. FIG. 12(a) is a cross-sectional view showing an underframe with a lower surface applied with the foamable fire-resistant coating while a mounting part is exposed. FIG. 12(b) is a cross-sectional view showing that the underframe is subjected to heat from below. FIG. 12(c) is a cross-sectional view showing that the foamable fire-resistant coating, on its upper side, is in an advanced state of foam-formation due to the heat conducted to the underframe through the mounting part. FIG. 12(d) is a cross-sectional view showing that most of the foamable fire-resistant coating has melted and fallen off.

As shown in FIG. 12(a), this comparative example is similar to the present embodiment in that the foamable fire-resistant coating 4H is applied to the lower surface 11 of the underframe 1, but is different in that the mounting part 3 is not attached with the cover 5 for covering the exposed portion 31 exposed from the foamable fire-resistant coating 4H. When the underframe 1 is subjected to heat from below, as shown in FIG. 12(b), a lower portion 4H1 of the foamable fire-resistant coating 4H advances foaming at the early stage of heating. However, if the underframe 1 continues to be heated from below, as shown in FIG. 12(c), the heat transfers to the underframe 1 through the exposed portion 31 of the mounting part 3, causing the temperature of the lower surface 11 of the underframe 1 to rapidly rise and exceed the foaming start temperature of the foamable fire-resistant coating 4H. This will cause an upper portion 4H2 of the foamable fire-resistant coating 4H, which is in contact with the lower surface 11 of the underframe 1, to foam more and more. Then, the thus foamed upper portion 4H2 decreases in density, greatly lowering its strength. Consequently, the foamable fire-resistant coating 4H is no longer able to support its own weight, and hence most of the foamable fire-resistant coating 4H melts and falls off (Melting-off phenomenon), leaving a part of the upper portion 4H2 as shown in FIG. 12(d). This phenomenon prompts the deformation of the underframe 1 and the temperature rise of the floor upper surface, making it difficult for passengers and crew members to have sufficient evacuation time.

In contrast, according to the fire-resistant floor structure 10 of a railroad vehicle of the present embodiment, as described above, the mounting parts 3 are attached with the covers 5 covering the exposed portions 31 exposed from the foamable fire-resistant coating 4H, so that the covers 5 attached to the mounting parts 3 block heat against heating from below the floor, thus suppressing transfer of heat to the underframe 1 through the mounting part 3. Therefore, the temperature of the lower surface 11 of the underframe 1 slowly rises and is unlikely to reach the foaming start temperature of the foamable fire-resistant coating 4H. This can avoid the melting-off phenomenon of the foamable fire-resistant coating 4H applied to the lower surface 11 of the underframe 1 for a specified time. Consequently, it is possible to delay the deformation of the underframe 1 and the temperature rise of the floor upper surface, allowing sufficient time for passengers and crew members to evacuate.

Operations and Effects

According to the fire-resistant floor structure 10 of a railroad vehicle in the present embodiment described in detail above, the fire-resistant member 4 is the fire-resistant coating 4T applied to the lower surface 11 of the underframe 1. Thus, the fire-resistant member 4 can be formed thinner as compared with a heat-insulating layer made of glass fibers or ceramic fibers, so that a larger space can be provided under the underframe 1. This configuration can enhance the flexibility in installation of the underfloor equipment 2 while suppressing the intrusion of heat through the lower surface 11 of the underframe 1.

Since the mounting parts 3 are attached with the covers 5 covering the exposed portions 31 exposed from the fire-resistant coating 4T, the covers 5 attached to the mounting parts 3 can block heat, against heating from below the floor, so that the heat is less transferred to the underframe 1 via the mounting part 3. This configuration can avoid the phenomenon that the fire-resistant coating 4T applied to the lower surface 11 of the underframe 1 melts and falls off. Consequently, the fire-resistance performance of the fire-resistant coating 4T applied to the lower surface 11 of the underframe 1 can be maintained for a long period of time, thereby delaying the temperature rise of the floor upper surface and hence allowing sufficient time for passengers and crew members to evacuate.

The present embodiment can therefore provide the fire-resistant floor structure 10 of a railroad vehicle, capable of suppressing heat intrusion to the floor upper surface against heating from below the floor to improve a fire-resistance performance while ensuring the flexibility in installation of the underfloor equipment 2.

According to the present embodiment, further, the underfloor equipment 2 is installed on the mounting part 3 with the closing plate 6 interposed therebetween. Thus, even if the underfloor equipment 2 rapidly burns and falls off, the closing plate 6 is left attached to the mounting part 3. This closing plate 6 can keep the heat from transferring to the underframe 1 through the mounting part 3. This configuration can further delay a temperature rise of the floor upper surface, thereby allowing sufficient time for passengers and crew members to evacuate.

According to the present embodiment, moreover, the closing plate 6 is made of a material with lower heat conductivity than the mounting part 3. Thus, the closing plate 6 can further suppress heat transfer to the mounting part 3 against heating from below the floor. This configuration can further delay a temperature rise of the floor upper surface, so that the closing plate 6 is unlikely to be deformed and thus can maintain the fire-resistance performance for a long period of time. It is consequently possible to further delay the deformation of the underframe 1 and the temperature rise of the floor upper surface, thereby allowing passengers and crew members to have sufficient time to evacuate.

According to the present embodiment, the cover 5 is applied with the fire-resistant coating 4T. This fire-resistant coating 4T applied to the cover 5 can block intrusion of more heat against heating from below the floor. This configuration can further delay the deformation of the underframe 1 and a temperature rise of the floor upper surface, thus allowing sufficient time for passengers and crew members to evacuate.

According to the present embodiment, the fire-resistant coating 4T is the foamable fire-resistant coating 4H. When heated to a predetermined temperature, the fire-resistant coating 4T internally foams and expands, forming a heat-insulating layer. This heat-insulating layer can further suppress intrusion of heat through the lower surface 11 of the underframe 1. Further, the foamable fire-resistant coating 4H can be applied thinner as compared with a heat-insulating layer made of glass fibers or the like, so that a larger space is provided under the underframe 1. This configuration allows for even greater flexibility in installation of the underfloor equipment 2 while suppressing intrusion of heat through the lower surface of the underframe 1.

According to the present embodiment, the cover 5 is made of a material with lower heat conductivity than the mounting part 3. This cover 5 can further suppress the transfer of heat to the mounting part 3 against heating from below the floor. This configuration can further delay a temperature rise of the floor upper surface.

According to the present embodiment, the underframe 1 is formed of an extruded profile 1K made of aluminum alloy, the mounting part 3 is provided as the protruding part 3T in which the hanging groove 3M is formed in a T-shape, the protruding part 3T being integral with the underframe 1, protruding downward from the lower surface 11 of the underframe 1, and extending along the vehicle front-back direction, and the underfloor equipment 2 is fastened to the mounting part 3 with the closing plate 6 interposed therebetween by means of the hanging bolt 7 whose head 71 is inserted in the hanging groove 3M. This configuration enables easy installation of the underfloor equipment 2 at any position in the vehicle front-back direction, while achieving reduced weight of the underframe 1 and enhanced strength of the mounting part 3. Therefore, the installation position of the underfloor equipment 2 is allowed to be easily changed and also increased or decreased. Consequently, this configuration allows for even greater flexibility in installation of the underfloor equipment 2 while improving the underfloor fire-resistance performance.

According to the present embodiment, the heat-insulating member 73 with lower heat conductivity than the hanging bolt 7 is placed between the hanging-bolt seat surface 3Z1 of the hanging groove 3M and the head 71 of the hanging bolt 7. This configuration can avoid direct transfer of heat to the hanging-bolt seat surface 3Z1 of the hanging groove 3M through the hanging bolt 7 against heating from below the floor, so that the heat is less transferred to the underframe 1 formed with the hanging groove 3M. It is therefore possible to further delay a temperature rise of the underframe 1, thereby further delaying the deformation of the underframe 1 and a temperature rise of the floor upper surface to allow sufficient time for passengers and crew members to evacuate.

According to the present embodiment, the hanging-bolt seat surface 3Z1 and the closing-plate seat surface 3Z2 of the mounting part 3 are not coated with the fire-resistant coating 4T or the foamable fire-resistant coating 4H. This configuration can consequently avoid the hanging bolt 7 that fastens the underfloor equipment 2 to the mounting part 3 from loosening due to thickness decrease of the fire-resistant coating 4T or foamable fire-resistant coating 4H because of aging. It is therefore possible to reduce the workload for inspecting the hanging bolt(s) 7 that fastens the underfloor equipment 2.

According to the present embodiment, the air layers 8 are formed between the cover 5 and the side walls 31H of the protruding part 3T. The air layers 8 formed between the cover 5 and the protruding part 3T can block intrusion of more heat from below the floor due to fire. This configuration consequently can further delay the deformation of the underframe 1 and a temperature rise of the floor upper surface, thereby allowing sufficient time for passengers and crew members to evacuate.

INDUSTRIAL APPLICABILITY

The present invention is utilizable as a fire-resistant floor structure of a railroad vehicle with improved fire-resistance performance against underfloor fires while ensuring the flexibility in underfloor outfitting.

REFERENCE SIGNS LIST

1 Underframe
1K Extruded element
2 Underfloor equipment
3 Mounting part
3M Hanging groove
3T Protruding part
3Z1 Seat surface for hanging bolt
3Z2 Seat surface for closing plate
4 Fire-resistant member
4T Fire-resistant coating
4H Foamable fire-resistant coating
5 Cover
6 Closing plate
7 Hanging bolt
8 Air layer
10 Fire-resistant floor structure of a railroad vehicle
31 Exposed portion
31H Side wall
71 Head
73 Heat-insulating member

The invention claimed is:

1. A fire-resistant floor structure of a railroad vehicle, comprising:
an underframe having a lower surface;

a mounting part for installing an underfloor equipment to the lower surface of the underframe; and a fire-resistant coating applied to the lower surface of the underframe, wherein:

the mounting part includes an exposed portion exposed from the fire-resistant coating, and is attached with a cover that covers the exposed portion, the underframe is formed of an extruded profile made of aluminum alloy, the mounting part is provided as a protruding part in which a hanging groove is formed in a T-shape, the protruding part being integral with the underframe, protruding downward from the lower surface of the underframe, and extending along a vehicle front-back direction, the underfloor equipment is fastened to the mounting part, with a closing plate interposed between the underfloor equipment and the mounting part, by a hanging bolt having a head inserted in the hanging groove, and a heat-insulating member having lower heat conductivity than the hanging bolt is placed between a hanging-bolt seat surface of the hanging groove and the head of the hanging bolt.

2. The fire-resistant floor structure of a railroad vehicle according to claim 1, wherein the closing plate is made of a material with lower heat conductivity than the mounting part.

3. The fire-resistant floor structure of a railroad vehicle according to claim 1, wherein the cover is coated with the fire-resistant coating.

4. The fire-resistant floor structure of a railroad vehicle according to claim 1, wherein the fire-resistant coating is a foamable fire-resistant coating.

5. The fire-resistant floor structure of a railroad vehicle according to claim 4, wherein a hanging-bolt seat surface and a closing-plate seat surface of the mounting part are uncoated with the foamable fire-resistant coating.

6. The fire-resistant floor structure of a railroad vehicle according to claim 1, wherein the cover is made of a material with lower heat conductivity than the mounting part.

7. The fire-resistant floor structure of a railroad vehicle according to claim 1, wherein an air layer is formed between the cover and a side wall of the protruding part.

\* \* \* \* \*